(12) United States Patent
Haass et al.

(10) Patent No.: US 10,181,078 B1
(45) Date of Patent: Jan. 15, 2019

(54) ANALYSIS AND CATEGORIZATION OF EYE TRACKING DATA DESCRIBING SCANPATHS

(71) Applicant: National Technology & Engineering Solutions of Sandia, LLC, Albuquerque, NM (US)

(72) Inventors: Michael Joseph Haass, Albuquerque, NM (US); Andrew T. Wilson, Albuquerque, NM (US); Mark Daniel Rintoul, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 136 days.

(21) Appl. No.: 15/345,318

(22) Filed: Nov. 7, 2016

(51) Int. Cl.
*G06K 9/00* (2006.01)
*G06K 9/46* (2006.01)
*G06K 9/62* (2006.01)

(52) U.S. Cl.
CPC ......... *G06K 9/0061* (2013.01); *G06K 9/4604* (2013.01); *G06K 9/6202* (2013.01); *G06K 9/6218* (2013.01)

(58) Field of Classification Search
None
See application file for complete search history.

(56) References Cited

U.S. PATENT DOCUMENTS

| | | | |
|---|---|---|---|
| 7,391,887 B2 | 6/2008 | Durnell | |
| 8,670,183 B2 | 3/2014 | Glavin et al. | |
| 8,885,882 B1 | 11/2014 | Yin et al. | |
| 9,384,420 B2 | 7/2016 | Qvarfordt | |
| 2008/0049185 A1 | 2/2008 | Huffman et al. | |
| 2010/0245767 A1 | 9/2010 | Chao | |
| 2011/0078144 A1 | 3/2011 | Helfman et al. | |
| 2013/0002846 A1 | 1/2013 | De Bruijn et al. | |
| 2014/0003658 A1* | 1/2014 | Hein | G06K 9/00597 382/103 |
| 2014/0192325 A1* | 7/2014 | Klin | A61B 5/16 351/209 |
| 2018/0055354 A1* | 3/2018 | Zandi | A61B 3/113 |

* cited by examiner

*Primary Examiner* — Wei Wen Yang
(74) *Attorney, Agent, or Firm* — Medley, Behrens & Lewis, LLC

(57) ABSTRACT

Described herein are various technologies pertaining to analysis of eye tracking data. A head and/or eyes of an observer who is viewing a visual stimulus is monitored, and eye tracking data that is representative of the path of the eyes of the observer over time (a scanpath) is generated. The eye tracking data is time-series data that defines the location of the focal point, or other measurable characteristics, of the eyes of the observer on the visual stimulus over time. A feature vector is constructed based upon the eye tracking data, where the feature vector is representative of the eye tracking data, and is thus representative of the scanpath. The feature vector is compared with other feature vectors to identify scanpaths that correspond to the scanpath represented by the feature vector.

19 Claims, 5 Drawing Sheets

ANALYSIS AND CATEGORIZATION OF EYE TRACKING DATA DESCRIBING SCANPATHS

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Tools have been developed to detect where, along a target (such as a display screen), eyes of a user are focusing. These tools typically include a camera coupled to a computer, where the computer receives images of eyes of a user and projects the focal point of the eyes on the target based upon the images. Conventionally, tracking the locations where the user is focusing over time has been performed in the context of display advertising, such that an advertiser can understand which advertisements, or parts of an advertisement, catch the attention of the user. The path of the focus over the target over time is referred to herein as a scanpath.

This relatively limited use of eye-tracking tools (e.g., limited to the context of display advertising) is at least partially due to the volume of data that represents the scanpath of a user. Another limiting factor is the complexity involved with correlating scanpaths across multiple users or multiple targets. For example, an eye tracking tool can generate a series of positional coordinates to represent a scanpath, where each positional coordinate has a timestamp assigned thereto, and there can be a positional coordinate for each millisecond. Accordingly, for a relatively short time window, the tool can generate several thousand data points (where a data point includes positional coordinates and an associated timestamp). Further, the eye tracking data often includes noise. Additionally, different users can scan a target in different ways, which results in scanpaths that have different spatiotemporal characteristics. For instance, one user may start at the upper left and scan left to right until they reach the lower right portion of the target. A different user may start in the center of the target and spiral out until they have observed the entire target. Different users may also scan at different rates, moving across the target at different speeds that may depend on their level of experience with the type of target. Thus, difficulties arise when attempting to process eye tracking data in a meaningful way.

SUMMARY

The following is a brief summary of subject matter that is described in greater detail herein. This summary is not intended to be limiting as to the scope of the claims.

Described herein are various technologies pertaining to comparing eye scanpaths, and outputting an indication as to whether an eye scanpath is similar to another eye scanpath responsive to comparing the eye scanpaths. With more particularity, a camera can generate images of a user over time, wherein the user is viewing a target (such as a display screen), and wherein the images capture the eyes of the user. A computing system is in communication with the camera, and receives the images generated by the camera. The computing system computes, over time, locations on the target where the eyes of the user are focused. In an example, the computing system can be configured to detect sclera, irises, and pupils of eyes of the user, and can determine a position on the target where the eyes are focusing based upon these detected features. In another example, the computing system can be configured to estimate head pose of the user, and determine a position on the target where the eyes are focusing based upon the head pose. The computing system constructs eye tracking data using the computed locations referenced above. The eye tracking data can be time-series data, which can include X and Y (and possibly Z) coordinates and corresponding timestamps. It can be ascertained that the eye tracking data represents the scanpath of the eyes of the user.

As indicated previously, this eye tracking data can be difficult for the computing system to process. Accordingly, the computing system can construct an n-dimensional feature vector based upon the eye tracking data, where the n-dimensional feature vector is representative of at least a portion of the scanpath. For instance, features represented in the n-dimensional feature vector can include start location, end location, average velocity, maximum velocity, average acceleration, etc.

The computing system can also be configured to compare n-dimensional feature vectors, and output indications as to which scanpaths (represented by the feature vectors) correspond to one another. For instance, the computing system can be programmed to execute a clustering algorithm, where the clustering algorithm receives the n-dimensional feature vectors as input and outputs clusters of feature vectors (wherein feature vectors in a same cluster are more similar to one another than feature vectors in different clusters). Once the correspondences, or clusters, are identified, the computer can be configured to compare labels, or metadata, such as gender, age, target type, etc. associated with each scanpath and output indications of metadata characteristics that form a majority or minority membership of each cluster.

In an exemplary application, embodiments set forth above can be utilized in connection with training an individual whose job is to monitor objects on a screen (such as an airport security screener viewing images of baggage, a guard viewing images of an area, etc.). A screen can be configured to present an image to an individual, and the computing system constructs a feature vector that is representative of the eye scanpath of the individual over the image over time. The computing system compares the feature vector with other feature vectors previously constructed by the computing system (where the other feature vectors represent scanpaths of other individuals). The computing system can then output an indication that the scanpath of the individual corresponds with some other scanpath based upon the comparison, where the other scanpath is for a "novice" airport screener. This can indicate that the individual needs further training.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
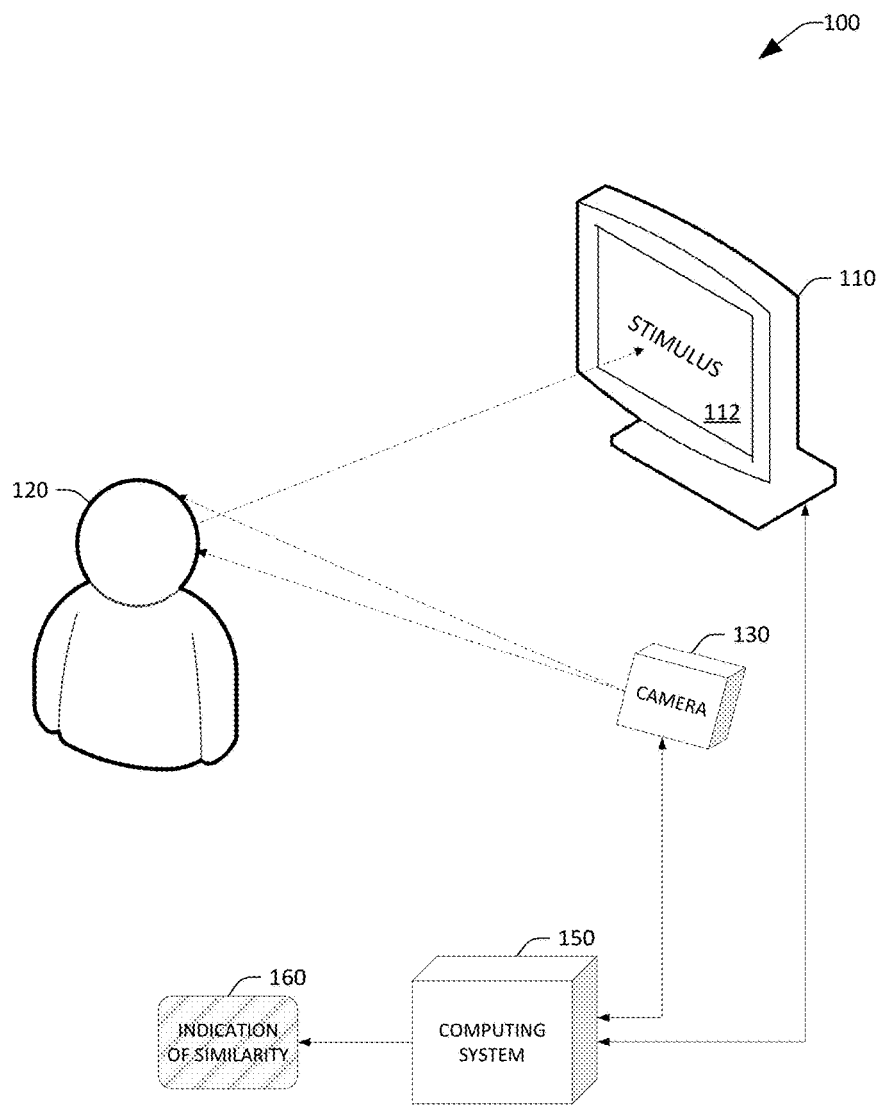
FIG. 1 is a functional block diagram of an exemplary system that is configured to process eye tracking data.

Various technologies pertaining to representing eye scanpaths of users with feature vectors are described herein, wherein like reference numerals are used to refer to like elements throughout. Further described herein are various technologies pertaining to determining that eye scanpaths correspond to one another based upon feature vectors that are representative of the eye scanpaths. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As used herein, the terms "component", "device", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component", "device", and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Described herein are various technologies related to identifying corresponding eye scanpaths based upon feature vectors that represent the scanpaths. Identifying corresponding eye scanpaths is accomplished by: 1) computing trajectory information from time-series eye tracking data without assumptions defining fixations and regions of interest; and 2) identifying corresponding scanpaths based on the extracted trajectory information. Further, said actions require limited or no preprocessing of the visual stimuli or the eye tracking data.

As a subject views a visual stimulus (e.g., such as an image on a display), a camera captures the eyes of the subject. A computing system, in communication with the camera, receives the images generated by the camera. The computing system, based upon the images, identifies, for a plurality of points in time, respective locations on the visual stimulus to which the eyes of the subject are directed. The computing system constructs eye tracking data using the computed locations and corresponding timestamps. The computing system, further, generates an n-dimensional feature vector based upon the eye tracking data, where the n-dimensional feature vector is representative of the eye scanpath over the visual stimulus. Based upon the n-dimensional feature vector, the computing system can determine whether the scanpath represented by the feature vector corresponds to a second scanpath (where the second scanpath can be another scanpath of the subject or a scanpath of another individual). Additional detail is set forth below.

With reference now to FIG. 1, an exemplary system 100 that can be utilized to capture and categorize eye tracking data is illustrated. Generally, the system is configured to cause a display 110 to present a visual stimulus 112 to a subject 120. As the subject 120 views the visual stimulus 112, a camera 130 generates images that capture the eyes of the subject 120. The visual stimulus 112 can be a prerecorded video. For example, the video may be of a white dot tracing a desired shape across the display 110. Alternatively, the visual stimulus can be a static image, e.g., an x-ray image of luggage that includes contraband or an instructional diagram. In another embodiment, the visual stimulus 112 can comprise a three-dimensional virtual reality image or physical object/scene that does not require the display 110.

The system 100 further comprises a computing system 150 that is in communication with the display 110 and the camera 130. The computing system 150 can be configured to compute, over time, locations on the visual stimulus 112 (and thus locations on the display 110) where the eyes of the user are focused. Based on the computed locations, the computing system 150 can construct eye tracking data that describes the scanpath (e.g., gaze) of the subject 120 as the subject views the visual stimulus 112. Further, the computing system 150 can be configured to generate a feature vector that represents the eye tracking data, and to conduct one or more operations based upon the feature vector. Additionally, the computing system 150 can output an indication 160 as to whether the scanpath of the subject 120 for the visual stimulus 112 corresponds to other scanpaths (represented by other feature vectors) based upon the feature vector and the other feature vectors. The other scanpaths can be scanpaths of the same subject 120 or of other subjects. Further, the other scanpaths can relate to the same visual stimulus 112 or a variety of stimuli.

Figure 2:
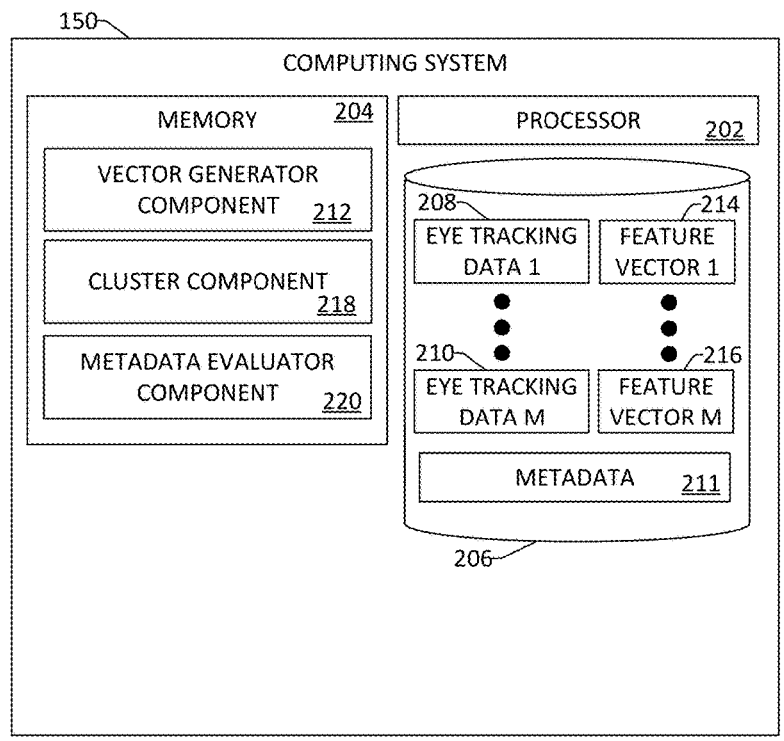
FIG. 2 is a functional block diagram of an exemplary system that is configured to process eye tracking data.

With reference now to FIG. 2, a functional block diagram of the computing system 150 is illustrated. The computing system 150 comprises a processor 202 and memory 204, wherein the memory 204 stores data that is accessible to the processor 202 and instructions that executable by the processor 202. The computing system 150 further comprises a data store 206, wherein the data store 206 stores m instances of eye tracking data 208-210 that are representative of respective scanpaths of subjects over the visual stimulus 112. As indicated above, the eye tracking data 208-210 can be generated based upon computed locations of eyes of respective subjects over the visual stimulus 112 over a window of time (e.g., from when the visual stimulus 112 is initially presented to a user to when the visual stimulus 112 is no longer presented to the user). With more particularity, the camera 130 (FIG. 1) captures images of the subject 120 over time, and an instance of the eye tracking data (e.g., the first eye tracking data 208) is constructed based upon the captured images. The first eye tracking data 208 can be constructed only for the time window that the visual stimulus 112 (e.g., a video, static image, etc.) is presented on the display 110 to the subject 120. The images, accordingly, can be used to estimate the focal point of the eyes of the subject 120 on the visual stimulus 112 over time. In an example, the eye tracking data 208 can be constructed based upon detection of sclera, irises, and pupils of eyes of the subject 120 as captured in images generated by the camera 130, wherein a determination can be made (for each image) as to where on the visual stimulus 112 the eyes of the subject 120 are focusing based upon the detected sclera, irises, and pupils. In another example, the eye tracking data 208 can be constructed based upon detected head pose of the subject 120 in images captured by the camera 130.

The eye tracking data 208-210 can each be time-series data, which can include X and Y (and possibly Z) coordinates and corresponding timestamps. The tuple of positional coordinates and a corresponding timestamp is referred to herein as a datapoint. It can be ascertained that the eye tracking data 208-210 represents scanpaths of the eyes of observers viewing the visual stimulus 112 (or other visual stimulus). Further, each instance of eye tracking data can include a large number of data points (e.g., millions of datapoints); thus, analysis of eye tracking data compiled for a large number of scanpaths can be computationally intense. The eye tracking data 208-210 can be in any suitable format, e.g., text, extensible markup language (XML), comma separated value (CSV), etc. Additionally, the eye-tracking data 208-210 can include other measurable features of an eye or head, such as pupil diameter (at numerous points in time), blink activity, orientation of the head, etc.

Further, metadata 211 can be assigned to the eye tracking data 208-210, wherein the metadata 211 can include labels assigned to the eye tracking data, and further wherein a label assigned to eye tracking data can be indicative of an identity of a visual stimulus that corresponds to the eye tracking data, an identity of the observer corresponding to the eye tracking data, a time when the eye tracking data was generated, a geographic location of the observer when the eye tracking data was generated, and so forth. In an example, the eye tracking data 208-210 can be used in connection with training an individual whose job functions include analyzing images. In this example, the mth eye tracking data 210 can represent a scanpath of an individual who has spent several years analyzing images, and therefore the mth eye tracking data 210 can be labeled to indicate that it represents the scanpath of an expert. Other of the eye tracking data can be labeled to indicate expertise level of the individuals corresponding to the eye tracking data.

The memory 204 includes a vector generator component 212 that is configured to construct m feature vectors 214-216 based upon the respective m instances of the eye tracking data 208-210. More specifically, the vector generator component 212 constructs the first feature vector 214 based upon the first eye tracking data 208, constructs a second feature vector based upon second eye tracking data, and constructs the mth feature vector 216 based upon the mth eye tracking data 210. The vector generator component 212, when constructing a feature vector (e.g., the first feature vector 214) based upon corresponding eye tracking data (e.g., the first eye tracking data 208), performs the following acts: 1) segments the eye tracking data 208 into q segments; 2) constructs a p-dimensional feature vector for each segment in the q segments; and 3) appends the p-dimensional feature vectors in a known order to form an n-dimensional feature vector, where n=p×q. These operations are discussed in turn.

For purposes of explanation, the vector generator component 212 will be described in connection with performing operations of segmenting eye tracking data, constructing p-dimensional feature vectors, and forming an n-dimensional feature data with respect to the first eye tracking data 208; it is to be understood, however, that the vector generator component 212 can perform such operations on other instances of the eye tracking data in the data store 206 using an approach similar to that described with respect to the first eye tracking data 208.

When segmenting the first eye tracking data 208, the vector generator component 212 can segment the first eye tracking data 208 as a function of time. For instance, the vector generator component 212 can segment the first eye tracking data 208 based upon temporal scale, where the first eye tracking data 208 is segmented into temporal intervals as a function of the temporal scales. A programmer can set forth a desired number of temporal scales (r), which can define a number of temporal intervals T into which the first eye tracking data 208 is to be segmented using the triangle number series:

$$T_r = \frac{r(r+1)}{2}.$$

For example, when a temporal scale of two is used, the vector generator component 212 can segment the first eye tracking data 208 into the following 3 segments:

$$SP(t)(t \in [0 \quad 1]) \tag{1}$$

$$SP(t)\left(t \in \left[0 \quad \frac{1}{2}\right]\right) \tag{2}$$

$$SP(t)\left(t \in \left[\frac{1}{2} \quad 1\right]\right) \tag{3}$$

where $SP(t)(t \in [0 \ 1])$ is a first segment of the first eye tracking data 208 corresponding to the entirety of the first eye tracking data 208, $$SP(t)\left(t \in \left[0 \quad \frac{1}{2}\right]\right)$$

is a second segment of the first eye tracking data 208 corresponding to time window t=0 to t=b/2, where b is the end time of the eye tracking data; and $$SP(t)\left(t \in \left[\frac{1}{2} \quad 1\right]\right)$$

is a third segment of the first eye tracking data 208 corresponding to time window t=b/2 to t=b. Thus, in this example, the vector generator component 212 segments the first eye tracking data 208 into q segments, where q=3. It is to be understood that the vector generator component 212 can utilize any suitable approach for segmenting eye tracking data based upon time, so long as the vector generator component 212 operates consistently across the eye tracking data 208-210. In other embodiments, the vector generator component 212 can segment eye tracking data based upon other parameters, such as distance or pathlength (where pathlength refers to a total distance travelled along the scanpath, and distance refers to linear distance between points).

Responsive to the vector generator component 212 segmenting the first eye tracking data 208-210 into q segments, the vector generator component 212 constructs a p-dimensional feature vector for each segment in the q segments based upon data points in the q segments. Exemplary features that can be included in a feature vector for a segment include, but are not limited to, start position, end position, maximum x value, minimum x value, maximum y value, minimum y value, geometric median in the x-dimension, geometric median in the y dimension, average acceleration, an end-to-end distance, a total distance, distance from a given fixed point or set of points, a start timestamp, an end timestamp, velocity, a total curvature, curvature average, turning area of a convex hull of the points, aspect ratio of a convex hull, perimeter length of a convex hull, centroid of a convex hull, ratio of end-to-end distance vs. total distance traveled, radius of gyration of the points, intratrajectory distances, etc. In a non-limiting example, features of the feature vector (for each segment) can be [geometric median x, geometric median y]. Accordingly, for each of the q segments, the vector generator component 212 can compute the geometric median x and geometric median y values based upon data points in the segment, and can construct a respective 2-dimensional feature vector for each of the q segments, where the 2-dimensional feature vector includes the computed geometric median x and geometric median y values. Therefore, with respect to the first eye tracking data 208, the vector generator component 212 constructs q p-dimensional feature vectors.

Responsive to constructing the q p-dimensional feature vectors for the first eye tracking data 208, the vector generator component 212 appends the p-dimensional feature vectors to one another (in a predefined order) to create the first n-dimensional feature vector 214, where the first n-dimensional feature vector 214 is representative of the first eye-tracking data 208, and thus the scanpath represented by the first eye tracking data 208. In an example where the vector generator component 212 segments the first eye tracking data 208 into 3 segments, and where the vector generator component 212 constructs 2-dimensional feature vectors [geometric median $x_{.1.}$, geometric median $y_{.1.}$], [geometric median $x_{.2.}$, geometric median $y_{.2.}$], and [geometric median $x_{.3.}$, geometric median $y_{.3.}$], respectively, for the 3 segments, the vector generator component 212 can append such feature vectors together to form the following 6-dimensional feature vector: [geometric median $x_{.1.}$, geometric median $y_{.1.}$, geometric median $x_{.2.}$, geometric median $y_{.2.}$, geometric median $x_{.3.}$, geometric median $y_{.3.}$]. Again, the vector generator component 212 can perform the above-described processing with respect to each instance of eye tracking data in the eye tracking data 208-210, thereby constructing the m n-dimensional feature vectors 214-216. Moreover, while not shown, the n-dimensional feature vectors 214-216 can have pointers assigned thereto that respectively point to the eye tracking data 208-210 represented by the feature vectors 214-216, and thus point to the metadata 211 that is assigned to the eye tracking data 208. Additionally or alternatively, the n-dimensional feature vectors 214-216 can have pointers assigned thereto that point directly to the metadata 211. Thus, the metadata assigned to the first eye tracking data 208 is also assigned to the first feature vector 214.

The memory 204 further comprises a cluster component 218 that is configured to execute a clustering algorithm, where the clustering algorithm receives the n-dimensional feature vectors 214-216 as inputs and outputs clusters of feature vectors. In an embodiment, the clustering algorithm can utilize a scale-insensitive approach to clustering. For instance, the cluster component 218 can generate clusters through use of a density based spatial clustering algorithm, e.g., DBSCAN. For density based spatial clustering, the total number of clusters does not need to be specified a priori. Further, the clustering algorithm can be based upon parameters set forth by a programmer or operator. The parameters can comprise a minimum number of members required to form a cluster and a neighborhood radius.

The cluster component 218 can be configured to output an indication to a display (or other output interface) as to at least one cluster of n-dimensional feature vectors formed by the cluster component 218. For instance, the cluster component 218 can output an indication that the first feature vector 214 is in a same cluster as the mth feature vector, thereby indicating that the scanpaths represented by such feature vectors correspond to one another (e.g., are in some way similar to one another). In another example, the cluster component 218 can output an indication that the first feature vector 214 is not clustered with any other feature vector, thereby indicating that the scanpath represented by the first feature vector 214 is dissimilar from other scanpaths represented by other feature vectors. Further, since the feature vectors 214-216 have pointers assigned thereto that point to the respective eye tracking data 208-210, the eye tracking data corresponding to feature vectors in a cluster can be retrieved for presentation on a display (thereby allowing for an operator to visually inspect the eye tracking data).

The memory 204 can further include a metadata evaluator component 220 that is configured to utilize the metadata 211 in connection with analyzing clusters formed by the cluster component 218. For example, the metadata evaluator component 220 can output an indication as to metadata assigned to feature vectors in a cluster. This indication can identify a particular label that is assigned to a majority of feature vectors in the cluster, a label that is not assigned to any feature vectors in a cluster, and so forth. In another exemplary embodiment, the metadata evaluator component 220 can filter feature vectors based on labels assigned thereto prior to the cluster component 218 clustering feature vectors. For instance, an operator may wish to only cluster feature vectors that have a time assigned thereto within a certain time window; the metadata evaluator component 220 can filter feature vectors that have times assigned thereto that are outside of the time window.

There are numerous practical applications for the operations set forth above. For instance, the computing system 150 can be employed in connection with training users whose job functions include visually inspecting imagery. To that end, a first subset of the eye tracking data 208-210 can be labeled in the metadata 211 as corresponding to experts in inspecting imagery, while a second subset of the eye tracking data 208-210 can be labeled in the metadata 211 as corresponding to novices in inspecting imagery. When training a trainee, eye tracking data representative of a scanpath of the trainee over visual stimulus can be generated, and the computing system 150 can construct an n-dimensional feature vector based upon the eye tracking data and causes such feature vector to be stored in the data store 206. The cluster component 218 thereafter executes the clustering algorithm over the n-dimensional feature vectors in the data store, and the metadata evaluator component 220 outputs an indication as to metadata assigned to feature vectors are included in a cluster with the feature vector corresponding to the trainee. If the feature vector is included in a cluster with feature vectors corresponding to "expert" eye tracking data, then it can be ascertained that the trainee is performing well.

Figure 3:
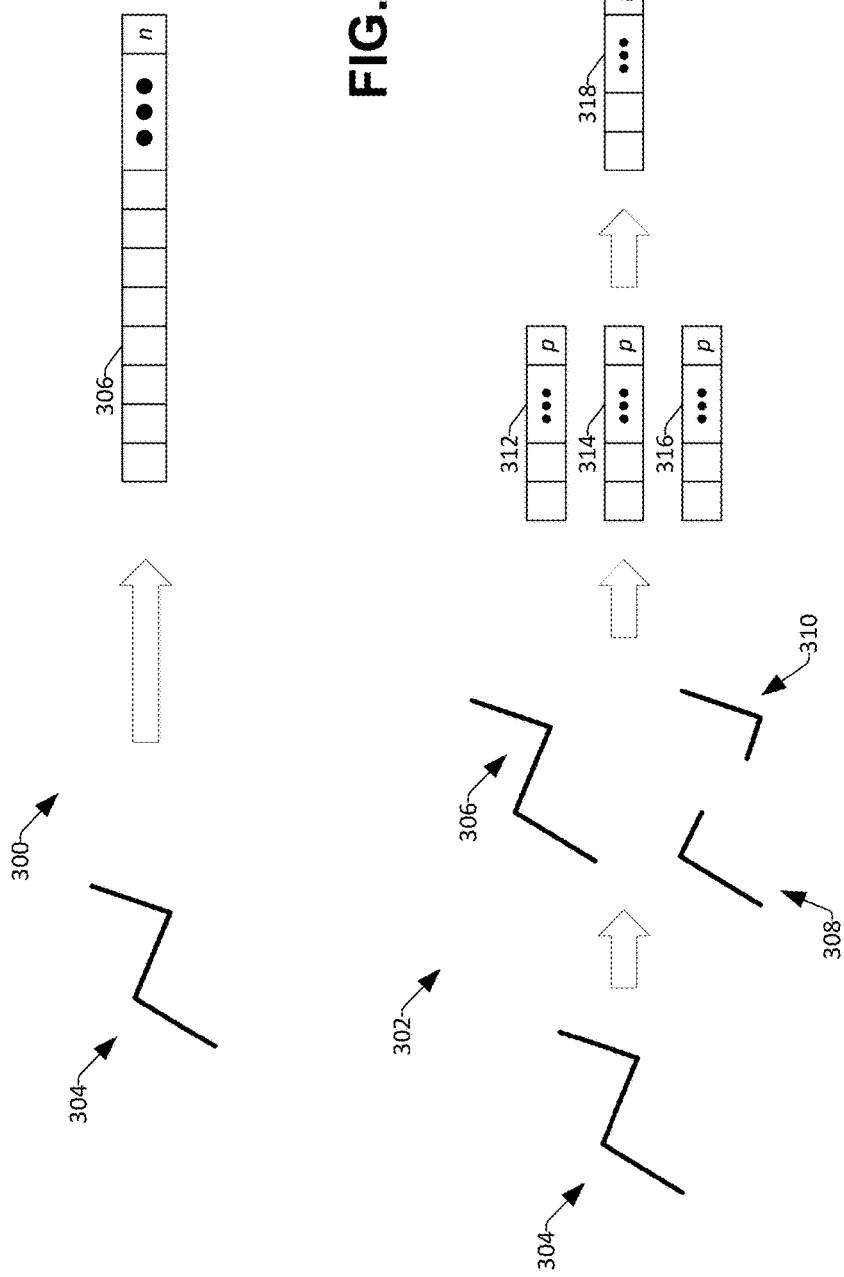
FIGS. 3A and 3B are flow diagrams illustrating generation of feature vectors that are representative of eye scanpaths.

Turning now to FIGS. 3A and 3B, flow diagrams 300 and 302 visually depicting construction of an n-dimensional feature vector by the vector generator component 212 is illustrated. With reference solely to FIG. 3A, the vector generator component 212 receives eye tracking data 304, which is time-series data that comprises a plurality of data points, with each data point including positional coordinates and a time stamp. The vector generator component 212 constructs an n-dimensional feature vector 306 based upon data points in the eye tracking data 304. Exemplary features have been described above. It is to be noted that in this example, the vector generator component 212 does not segment the eye tracking data 304; accordingly, it is to be understood that segmentation is optional.

Now referring to FIG. 3B, the vector generator component 212 receives the eye tracking data 304, and then segments the eye tracking data 304 into q segments 308-312 (shown in FIG. 3A as being 3 segments). Again, the vector generator component 212 can utilize any suitable technique for segmenting the eye tracking data 304. Thereafter, the vector generator component 212 constructs q feature vectors 314-318 corresponding to the q segments, wherein the feature vectors 314-318 are populated with values based upon data points in the corresponding segments 308-312. The vector generator component 212 appends the feature vectors 314-318 to one another to form an n-dimensional feature vector 320 (where the vector generator component 212 appends the feature vectors 314-318 to one another in a predefined order).

A plurality of software/programming languages can be utilized for the various embodiments presented herein. For example, Python programming language can be utilized to process the eye tracking data 208-210 to generate the n-dimensional feature vectors 214-216. Hence, the vector generator component 212 can be written in the Python programming language. The cluster component 218 can be programmed in C++ programming language, wherein advantage can be taken of the ability of the C++ programming language to analyze the various features in the n-dimensional feature vectors 214-216. Compilation of the respective programs written with the respective programming languages generates machine code that can be processed by the processor 202. It is to be appreciated that while the foregoing discloses Python and C++ programming languages, any programming language can be utilized to facilitate one or more of the embodiments presented herein.

Graphical data pertaining to a scanpath can be presented on a display in any suitable manner. For example, scanpaths can be graphically represented using heat maps, fractal maps, tree maps, choropleth maps, etc. Alternatively, a color progression can be utilized to indicate scanpath direction, e.g., at the starting point, the scanpath is colored blue, but as the scanpath reaches the ending point, the scanpath is colored red.

Moreover, any suitable technique to plot a scanpath can be employed. For example, line width (thickness) of a represented scanpath can be utilized to indicate a particular feature, such as the line width is thickened as the scanpath repeatedly returns to a corresponded area of the visual stimulus 112.

Figure 4:
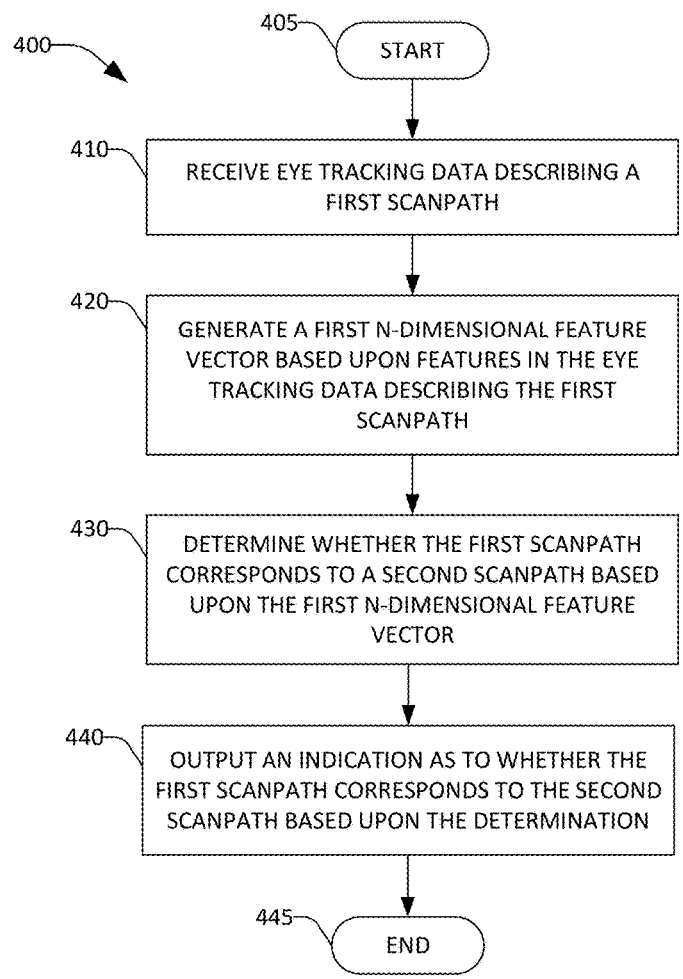
FIG. 4 is a flow diagram illustrating an exemplary methodology for determining whether a first scanpath corresponds to a second scanpath based upon an n-dimensional feature vectors that are representative of the scanpaths.

FIG. 4 illustrates an exemplary methodology related to determining whether a scanpath is similar to a second scanpath based upon an n-dimensional feature vector generated based upon eye tracking data corresponding to the scanpath. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodologies described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

The methodology 400 starts at 405, and at 410, eye tracking data describing a first scanpath can be received (e.g., at a computing system). At 420, a first n-dimensional feature vector can be generated based upon at least one or more features of the eye tracking data. At 430, based upon at least the first n-dimensional feature vector, a determination as to whether the first scanpath corresponds to a second scanpath can be made. At 440, based upon the determination, an indication as to whether the first scanpath corresponds to the second scanpath can be output (e.g., by the computing system). The methodology 400 completes at 445.

Figure 5:
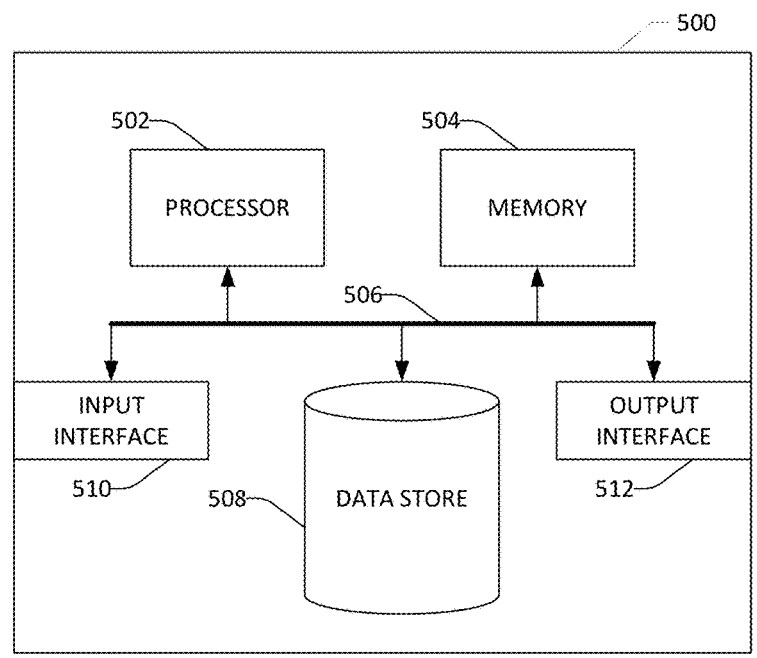
FIG. 5 illustrates an exemplary computing device.

Referring now to FIG. 5, a high-level illustration of an exemplary computing device 500 that can be used in accordance with the systems and methodology disclosed herein is illustrated. For example, the computing device 500 may be utilized to extract one or more features from eye tracking data, generate a n-dimensional feature vector from the one or more features, and further compare the n-dimensional feature vector with other feature vectors. For example, the computing device 500 can operate as the computing system 150 and/or a portion thereof. The computing device 500 includes at least one processor 502 that executes instructions that are stored in a memory 504. The instructions may be, for instance, instructions for implementing functionality described as being carried out by one or more components discussed above or instructions for implementing one or more of the methods described above. The processor 502 may access the memory 504 by way of a system bus 506. In addition to storing executable instructions, the memory 504 may also store signatures, time-series signals, etc.

The computing device 500 additionally includes a data store 508 that is accessible by the processor 502 by way of the system bus 506. The data store 508 may include executable instructions, test signatures, standard signatures, etc. The computing device 500 also includes an input interface 510 that allows external devices to communicate with the computing device 500. For instance, the input interface 510 may be used to receive instructions from an external computer device, from a user, etc. The computing device 500 also includes an output interface 512 that interfaces the computing device 500 with one or more external devices. For example, the computing device 500 may display text, images, etc., by way of the output interface 512.

Additionally, while illustrated as a single system, it is to be understood that the computing device 500 may be a distributed system. Thus, for instance, several devices may be in communication by way of a network connection and may collectively perform tasks described as being performed by the computing device 500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
   at least one processor; and
   memory that stores computer-executable instructions that, when executed by the at least one processor, cause the at least one processor to perform acts comprising:
   receiving eye tracking data for a first scanpath, wherein the eye tracking data comprises data points having positional coordinates and corresponding timestamps;
   segmenting the eye tracking data into a plurality of segments, wherein the plurality of segments comprises a first segment and a second segment, wherein the first segment comprises an entirety of the eye tracking data and the second segment consists of less than the entirety of the eye tracking data;
   constructing a first p-dimensional feature vector based upon the first segment;
   constructing a second p-dimensional feature vector based upon the second segment;
   constructing an n-dimensional feature vector based upon features of the eye tracking data, wherein the n-dimensional feature vector comprises the first p-dimensional feature vector and the second p-dimensional feature vector;
   determining that the first scanpath corresponds to a second scanpath based upon the n-dimensional feature vector; and
   responsive to determining that the first scanpath corresponds to the second scanpath, outputting an indication that the first scanpath corresponds to the second scanpath.

2. The computing system of claim 1, wherein determining that the first scanpath corresponds to the second scanpath further comprises:
   comparing the n-dimensional feature vector with a second n-dimensional feature vector, the second n-dimensional feature vector representative of the second scanpath; and
   determining that the first scanpath corresponds to the second scanpath based upon the comparison of the n-dimensional feature vector with the second n-dimensional feature vector.

3. The computing system of claim 1, wherein determining that the first scanpath corresponds to the second scanpath further comprises:
   clustering n-dimensional feature vectors into a plurality of clusters based upon a clustering parameter, wherein the n-dimensional feature vectors comprise the n-dimensional feature vector and the second n-dimensional feature vector, and further wherein a cluster in the plurality of clusters includes the n-dimensional feature vector and the second n-dimensional feature vector; and
   determining that the first scanpath corresponds to the second scanpath based upon the cluster including the n-dimensional feature vector and the second n-dimensional feature vector.

4. The computing system of claim 3, wherein the clustering parameter is a minimum number of members to form a cluster.

5. The computing system of claim 3, wherein the parameter is a neighborhood radius.

6. The computing system of claim 3, wherein the eye tracking data is collected in response to a visual stimulus being presented on a display.

7. The computing system of claim 6, the acts further comprising:
   receiving second eye tracking data describing the second scanpath, wherein the second eye tracking data comprises second data points having second positional coordinates and corresponding second timestamps.

8. The computing system of claim 7, wherein the second eye tracking data is collected in response to the visual stimulus being presented on the display.

9. The computing system of claim 1, wherein the eye tracking data is segmented into the plurality of segments based upon time.

10. The computing system of claim 1, wherein features of the n-dimensional feature vector comprise:
    a first geometric median of eye tracking data in the first segment; and
    a second geometric median of eye tracking data in the second segment.

11. A method executed by a computer system that includes a processor and memory, the method comprising:

receiving eye tracking data that represents a first scanpath, wherein the eye tracking data is time-series data that represents focal points of eyes of an observer over a visual stimulus over time;

segmenting the eye tracking data into a plurality of segments, wherein the plurality of segments comprise a first segment and a second segment, wherein the first segment consists of a first number of data points in the time-series data, the second segment consists of a second number of data points in the time-series data, and further wherein the first number of data points is different from the second number of data points;

constructing a first p-dimensional feature vector for the first segment;

constructing a second p-dimensional feature vector for the second segment;

constructing an n-dimensional feature vector that represents the first scanpath, wherein the n-dimensional feature vector comprises the first p-dimensional feature vector and the second p-dimensional feature vector;

determining that the first scanpath corresponds to a second scanpath based upon values of the n-dimensional feature vector; and responsive to determining that the first scanpath corresponds to the second scanpath, outputting an indication that the first scanpath corresponds to the second scanpath.

12. The method of claim 11, wherein determining that the first scanpath corresponds to the second scanpath comprises:

comparing the n-dimensional feature vector with a second n-dimensional feature vector, the second n-dimensional feature vector represents the second scanpath; and determining that the first scanpath corresponds to the second scanpath based upon the comparison of the n-dimensional feature vector with the second n-dimensional feature vector.

13. The method of claim 12, wherein determining that the first scanpath corresponds to the second scanpath further comprises:

clustering n-dimensional feature vectors into a plurality of clusters, wherein a cluster in the plurality of clusters comprises the n-dimensional feature vector and the second n-dimensional feature vector; and determining that the first scanpath corresponds to the second scanpath based upon the n-dimensional feature vector and the second n-dimensional feature vector being included in the cluster.

14. The method of claim 11, wherein the n-dimensional feature vector includes:

a first value for a first geometric median of the first number of data points in the time-series data; and a second value for a second geometric median of the second number of data points in the time-series data.

15. A computer-readable storage medium comprising instructions that, when executed by a processor, cause the processor to perform acts comprising:

receiving eye tracking data that represents a first scanpath, wherein the eye tracking data is time-series data that represents focal points of eyes of an observer over a visual stimulus over time;

segmenting the eye tracking data into a plurality of segments, wherein the plurality of segments comprise a first segment and a second segment, wherein the first segment consists of a first number of data points in the time-series data, the second segment consists of a second number of data points in the time-series data, and further wherein the first number of data points is different from the second number of data points;

constructing a first p-dimensional feature vector for the first segment;

constructing a second p-dimensional feature vector for the second segment;

constructing an n-dimensional feature vector that represents the first scanpath, wherein the n-dimensional feature vector comprises the first p-dimensional feature vector and the second p-dimensional feature vector;

determining that the first scanpath corresponds to a second scanpath based upon values of the n-dimensional feature vector; and responsive to determining that the first scanpath corresponds to the second scanpath, outputting an indication that the first scanpath corresponds to the second scanpath.

16. The computer-readable storage medium of claim 15, wherein determining that the first scanpath corresponds to the second scanpath comprises:

comparing the n-dimensional feature vector with a second n-dimensional feature vector, the second n-dimensional feature vector represents the second scanpath; and determining that the first scanpath corresponds to the second scanpath based upon the comparison of the n-dimensional feature vector with the second n-dimensional feature vector.

17. The computer-readable storage medium of claim 16, wherein determining that the first scanpath corresponds to the second scanpath further comprises:

clustering n-dimensional feature vectors into a plurality of clusters, wherein a cluster in the plurality of clusters comprises the n-dimensional feature vector and the second n-dimensional feature vector; and determining that the first scanpath corresponds to the second scanpath based upon the n-dimensional feature vector and the second n-dimensional feature vector being included in the cluster.

18. The computer-readable storage medium of claim 15, wherein the n-dimensional feature vector includes:

a first value for a first geometric median of the first number of data points in the time-series data; and a second value for a second geometric median of the second number of data points in the time-series data.

19. The computer-readable storage medium of claim 15, wherein the eye tracking data is segmented into the plurality of segments based upon time.

* * * * *